United States Patent [19]

Meline et al.

[11] Patent Number: 4,607,531
[45] Date of Patent: Aug. 26, 1986

[54] TORSIONAL-AXIAL EXTENSOMETER WITH ADDITIONAL RESTRAINT TO LIMIT UNNECESSARY MOVEMENTS

[75] Inventors: Harry R. Meline, Minnetonka; Richard A. Meyer, Carver, both of Minn.

[73] Assignee: MTS Systems Corporation, Eden Prairie, Minn.

[21] Appl. No.: 618,470

[22] Filed: Jun. 8, 1984

[51] Int. Cl.⁴ .............................................. G01B 5/30
[52] U.S. Cl. .............................................. 73/794
[58] Field of Search .............. 73/760 (U.S. only), 73/763, 767, 781, 782, 774, 794, 795, 847; 33/147 D, 148 D, DIG. 13

[56] References Cited

U.S. PATENT DOCUMENTS

| | | | |
|---|---|---|---|
| 2,663,085 | 12/1953 | Ruge | 33/147 |
| 2,666,262 | 1/1954 | Ruge | 33/148 |
| 3,402,472 | 9/1968 | Riley | 33/147 |
| 3,789,508 | 2/1974 | Meline | 33/148 |
| 4,160,325 | 7/1979 | DeNicola | 33/148 |
| 4,251,918 | 2/1981 | Duggan | 33/148 |
| 4,491,021 | 1/1985 | Meline | 73/767 |

Primary Examiner—Stewart J. Levy
Assistant Examiner—Robert R. Raevis
Attorney, Agent, or Firm—Kinney & Lange

[57] ABSTRACT

An extensometer assembly measures axial strain, torsional strain, and various combinations of these strains in a specimen on which the extensometer is mounted, through the use of two extensometers on opposite sides of the specimen coupled by a cross-beam. Connecting assemblies are used to eliminate flexibility in unneeded axes to thereby minimize the opportunities for unwanted signals to occur. The mounting frame is stiff in all axes which are not necessary for measurement. The frame is soft in necessary axes for operation.

13 Claims, 6 Drawing Figures

TORSIONAL-AXIAL EXTENSOMETER WITH ADDITIONAL RESTRAINT TO LIMIT UNNECESSARY MOVEMENTS

BACKGROUND OF THE INVENTION

1. Field of the Invention

The present invention relates to extensometers for simultaneously measuring axial and torsional strain in the same specimen.

2. Description of the Prior Art

Apparatus for measuring torsional and axial strain in the same specimen has previously been advanced.

Harry R. Meline, U.S. patent application Ser. No. 474,700, filed on Mar. 11, 1983 for an Axial-Torsional Extensometer, assigned to the same assignee as this application discloses an extensometer which has a coupling frame that is used for mounting two extensometers on opposite sides of a specimen, but which has softness in more degrees of freedom than the present device. If there are unnecessary degrees of freedom, under certain loading conditions oscillations can occur that will affect the signal by inducing dynamic errors in the output of the instrument. The mounting frame in the present application is different from the prior device and a different arrangement is utilized for measuring torsional strain.

A type of a "bi-axial" extensometer is shown in U.S. Pat. No. 4,251,918. It essentially measures strain along the longitudinal or loading axis of the specimen, or strains which cause changes in diameter of the specimen, but not axial and torsional strains of the specimen.

U.S. Pat. No. 4,160,325 illustrates an extensometer that is designed for simultaneously measuring axial strain and torsional deflection of a specimen subject to axial and torsional load. In this particular device, separate gage members are clamped to the specimens and cantilever type motion sensors acting between the gage members indicate relative torsional movement, or relative axial movement. The calibration of this device appears to be rather complex, and it would appear that a tendency of one of the gage members to creep relative to the other would limit the accuracy. Another type of extensometer which has flexure beams that bend during use is shown in U.S. Pat. No. 2,663,085. However, the extensometer shown in U.S. Pat. No. '085 is capable of measuring axial strains only and does not relate to the measurement of torsional strains.

U.S. Pat. No. 3,789,508 also shows an axial extensometer having cross flexure members for holding the arms in an assembly in a manner useful in measuring strains.

U.S. Pat. No. 3,402,472 shows an extensometer which comprises elongated parallel rods on opposite sides of the specimen, which have abutments that engage the specimen. The rods are supported on a cross member that spans the specimen, but the cross member is very thin in the longitudinal axial direction of the specimen, so that it may permit unwanted movements of the extensometer rods and assembly. It is intended to be flexible in that a type of flexure member is needed to preserve the parallel relationship of the long rods or legs on each side of the specimen.

SUMMARY OF THE INVENTION

The present invention relates to a torsional and axial strain measurement extensometer assembly which simultaneously measures the axial and torsional strains in a specimen, and which has a mounting frame supporting two extensometer sections in position. The mounting frame provides rigidity in all degrees of freedom other than those which are necessary for measuring the specimen strains of interest and accommodating changes in the specimen that occur during loading.

In particular, the frame includes a rigid cross beam member that spans a specimen being tested, and which has links extending from the cross member to a first extensometer that prevent any substantial movement of the extensometer relative to the cross member in direction parallel to the specimen axis, while permitting movement perpendicular to the axis of the specimen to enable placing the extensometer assembly onto a specimen. The second link restrains relative movement between the cross member and the second extensometer parallel to the axis of the specimen and also perpendicular to the specimen axis, as shown. The links extending from the rigid cross beam member to the respective extensometer sections both permit twisting or pivoting about axes perpendicular to the specimen axis to accommodate differences in diameter of the specimen at different axial locations.

Additionally, the torsional measuring extensometer section has an arm mounted to move independently of a reference point formed by a second point on the same extensometer section.

The extensometer sections are soft or flexible in the degrees of freedom necessary for measuring both axial and torsional strains, but the mounting provides rigidity or stiffness in all other directions of normal loads. It is necessary that the extensometer assembly permits freedom of movement of the extensometer sections relative to each other in direction along the specimen axis, and also each of the extensometer sections must be able to accommodate changes in diameter of the specimen at different positions along its axis. Actually the specimen may also increase or decrease in diameter uniformly along its length, which also must be accommodated by the extensometer assembly. Accurate measurements are obtained by eliminating unneeded degrees of freedom from the mounting to raise the natural frequency of the assembly and eliminate unwanted signals to make the measured output more accurate.

BRIEF DESCRIPTION OF THE DRAWINGS

FIG. 1 is a side elevational view of an extensometer assembly made according to the present invention shown installed on a specimen;

DETAILED DESCRIPTION OF THE PREFERRED EMBODIMENTS

Referring to FIG. 1, an extensometer assembly indicated generally at 10 comprises a first extensometer or extensometer section 11 and a second extensometer or extensometer section 12. The extensometer section 11 is on one side of a specimen 13 which is to be tested under torsional and axial loads causing torsional and axial strains. The second extensometer section 12 is mounted diametrically opposite from the first extensometer 11.

Figure 2:
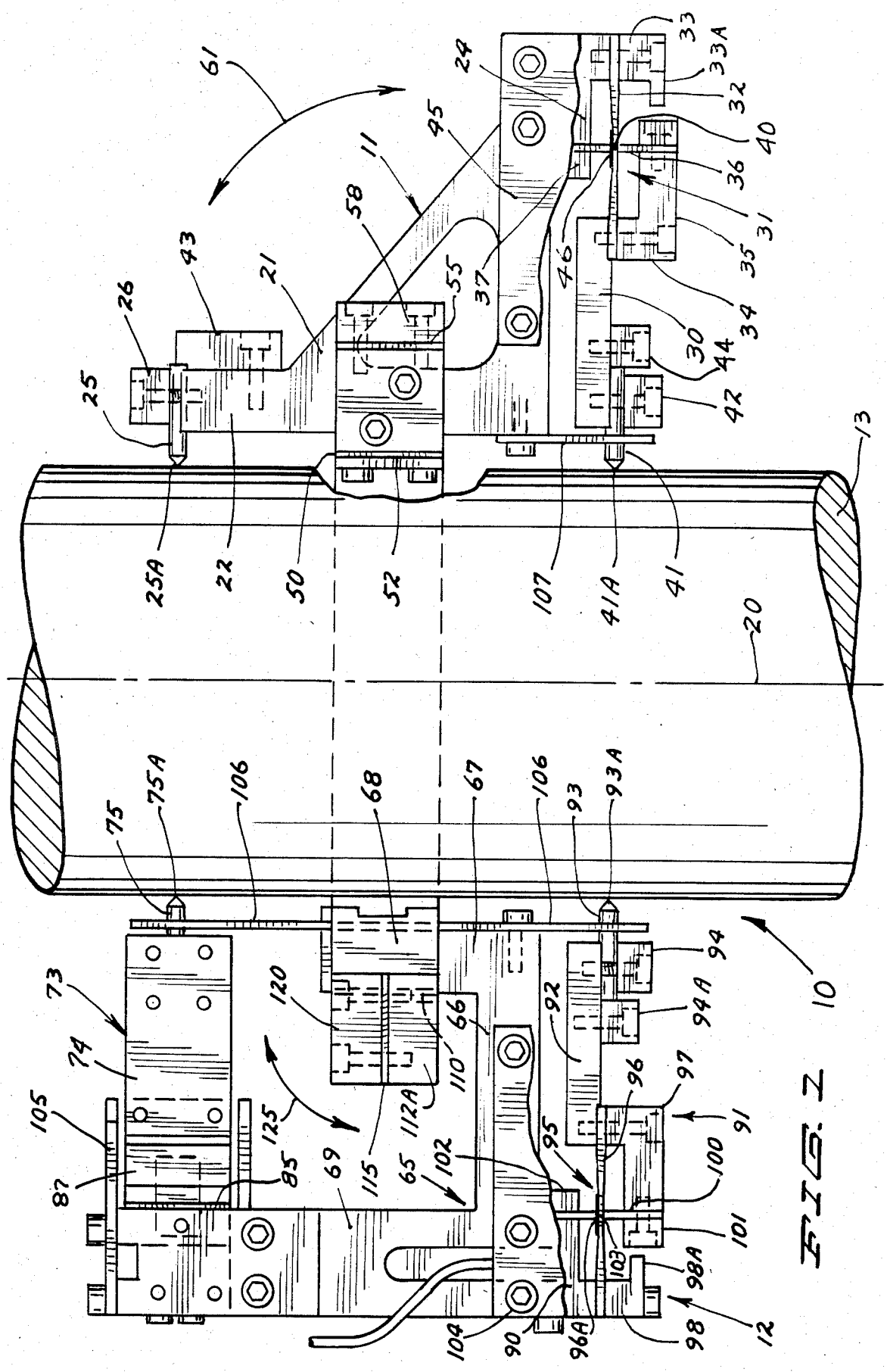
FIG. 2 is a top plan view of the device in FIG. 1.
Figure 2:
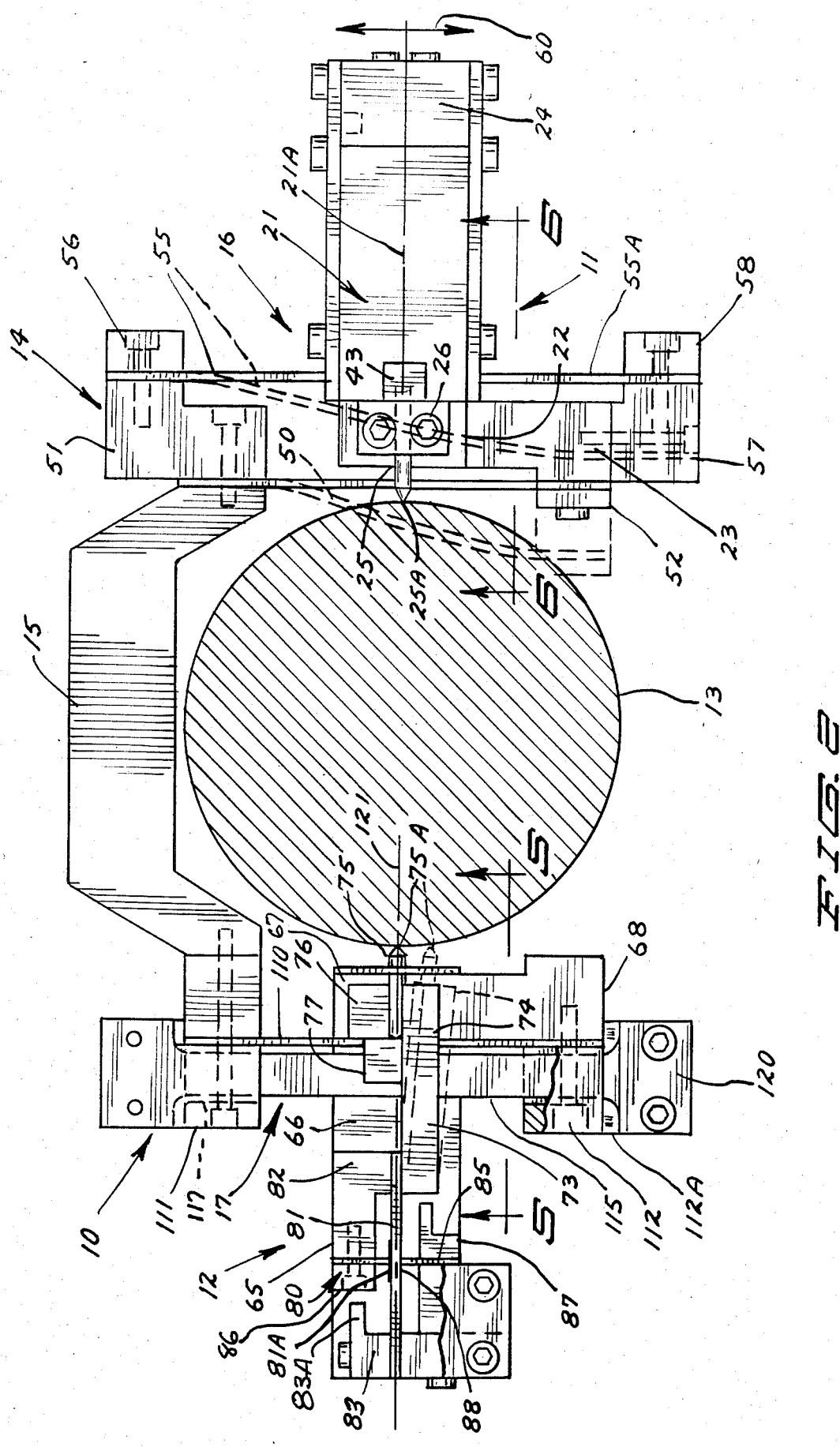

As shown in FIG. 2, for example, the extensometer sections 11 and 12 are coupled to each other through a structural support system indicated generally at 14 including a rigid cross-frame 15, and at opposite ends of the frame 15 there are flexure supports 16 and 17, respectively, that are used for supporting the extensometer sections 11 and 12. In the preferred embodiment, the flexure supports 16 and 17 each comprise two spring flexure beams. The supports are different from each other to give different degrees of rigidity as will be more fully explained. The flexure supports are suitably supported on the opposite ends of the frame 15 by clamping the supports in place. As shown, the flexure assembly 17 does not permit any movement of the extensometer section 12, which it supports, perpendicular to the longitudinal axis of the specimen 13 along the plane of the extensometer section, while the flexure assembly 16 is made so that it will permit movement in such direction to provide a resilient pressure on the extensometer section against the specimen to hold the assembly in working position.

The specimen 13 is a cylindrical specimen as shown, and has a central longitudinal axis 20. Loading for tension and compression is generally along the central axis 20 of the specimen, and torsional loading is a twisting load on the specimen 13 about the axis 20.

The first extensometer section 11 includes a main frame 21, that has an uprightly extending neck 22, and an integral laterally extending support block 23 (see FIGS. 2 and 4) that is located about midway in vertical direction of the frames. The frame 21 also has an integral lower mounting block portion indicated generally at 24. At the upper end of the neck 22, a specimen contact point or pin 25 is clamped in place with a suitable block 26 at the top of the neck 22. The pin 25 has a sharp point 25A which is the specimen engaging point, and which point forms a reference for the extensometer section 11 for measurement of axial strains.

The lower mounting block 24 is used for supporting a moveable arm 30, the outer end of which moves for measuring specimen elongation along the longitudinal axis of axis 20 of the specimen 13 with respect to the point 25A. The arm 30 is supported to the mounting block 24 through a cross flexure assembly 31 (see FIG. 1), in a conventional manner. The cross flexure assembly 31 includes a first spring flexure strap 32 that is clamped to the lower side of mounting block 24 at the outer end thereof with a clamp block 33. The opposite end of the flexure strap 32 is clamped with a block 34 to the arm 30. The arm 30 further has a cross flexure support block 35 attached thereto, onto which a second spring flexure strap 36 is clamped. The opposite end of the flexure strap 36 in turn is clamped with a block 37 to a specimen facing side surface of the mounting block 24 of the frame 21.

The flexure strap 32 has a central opening through which the flexure strap 36 extends, as is shown, and where the planes of the two straps intersect a bending or pivot axis 40 is formed, about which axis the arm 30 will easily flex. The axis 40 of flexing movement for arm 30 is generally perpendicular to the axis 20 of the specimen 13, and permits the arm 30 to move about the axis 40 so that a second contact pin 41 having a contact point 41A contacting the specimen and which is supported by the arm 30, can move away from or toward the pin point 25A when the specimen 13 is subjected to axial strains.

The pin 41 is held onto the outer end of the arm 30 with a suitable block 42 that is clamped in place with cap screws, as are the other clamp blocks used.

The specimen contact pins 25 and 41 are held from slipping in direction along their axes with blocks that are clamped to the respective members, for example block 43 is clamped to the neck portion 22 and forms an abutment for the end of the pin, and a block 44 is clamped to the arm 30 to form an abutment for the pin 41.

Suitable shield members 45 are attached to the frame 21 to cover the flexure straps and prevent them from being damaged.

Suitable strain gages indicated generally at 46, for example, are mounted on to the flexure strap 32 in a suitable manner and provide means for indicating the amount of bending of the flexure straps as the arm 30 moves about the axis 40 under axial loads on the specimen. Conventional instrumentation is utilized.

The extensometer section 11 is supported relative to the beam 15 through a flexure support arrangement 16, as stated. The flexure support 16 has parallel flexure beams that control the movement of the frame 21 relative to the support beam or frame 15 and provide rigidity in desired degrees of movement, while providing the ability to flex in other directions. The flexure support 16 includes a first spring flexure beam 50 that is a flat, pre-bent spring strap clamped with a suitable block 51 to one end of the rigid cross beam 15. The flexure beam 50 has its opposite end clamped to the laterally extending section 23 of the frame 21 through the use of a clamp block 52. The clamp blocks 51 and 52 are held with suitable cap screws to tightly clamp the ends of the flexure beam 50.

Flexure beam 50 is a flat beam having a horizontal longitudinal axis and a vertically oriented lateral width direction, as shown in FIGURE 2, and is pre-bent into a curve, so that when straightened to the solid line position shown in FIG. 2, it exerts a spring load on pins 25 and 41 to hold the extensometer sections on the specimen.

The flexure beam 50 may bend about transverse lines perpendicular to its length but is rigid in resisting loads in directions parallel to its plane. The beam 50 is selected in length so that when connected to the extensometer section 11, the points 25A and 41A are substantially along a plane that is perpendicular to and bisects the beam 50. A stabilizer flexure beam 55, parallel to beam 50 when the beams are straight, is substantially parallel to the beam 50 and has a first end that is clamped with a suitable block 56 to the outer end of block 51, and thus is supported relative to beam 15, and the other end of the stabilizer flexure 55 is clamped with respect to the laterally extending member 23 of frame 21 with a pair of blocks comprising a first spacer block 57 that is fixedly attached to the extension 23, and a clamp block 58 which clamps the end of the stabilizer flexure beam 55 in place against a surface of spacer block 57.

Figures 3, 4:
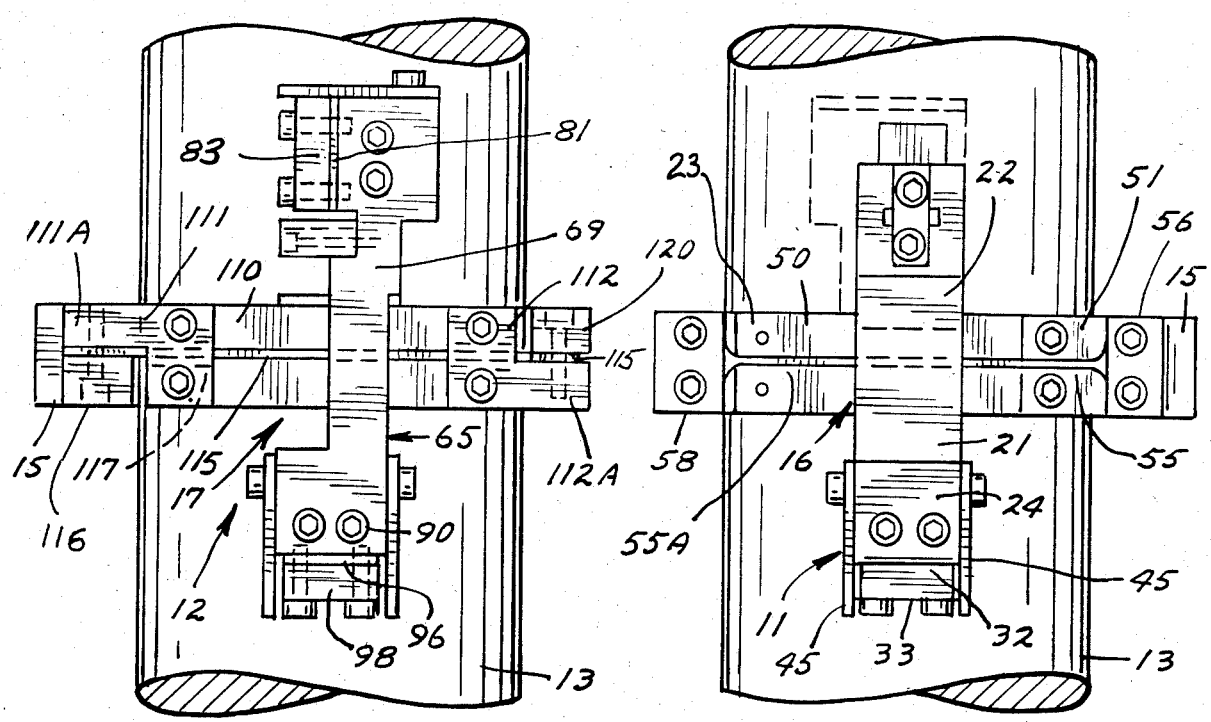
FIG. 3 is a side elevational view taken from the left hand side of FIG. 1.
FIG. 4 is a side elevational view taken from the right hand side in FIG. 1.

The center longitudinal section or length 55A of stabilizer flexure beam 55 is of quite small cross-sectional area but does have sufficient columnar strength to carry adequate compression loading. As shown in dotted lines in FIG. 2 the center section 55A of flexure beam 55 has a narrow, vertical width transverse to the longitudinal length that is of substantially less vertical height than the flexure beam 50. Also, the center section 55A of stabilizer flexure beam 55 is seen in FIG. 4. The end portions of flexure beam 55 are widened out to provide adequate clamping surfaces. The center section 55A could be round or square in cross section if desired, but dimension parallel to the specimen axis is kept small.

The use a pair of co-extensive flexure beams that are substantially equally spaced at corresponding locations along their lengths, permits the frame 21 of the extensometer section 11 and thus the entire extensometer section, to be flexed inwardly and outwardly relative to the specimen 13 parallel to a plane that bisects the frame 21 as generally shown in 21A in FIG. 2. When this is done, both of the flexure beams, including the main flexure beam 50 and the stabilizer flexure beam 55 will bend adjacent their supports or mountings to the cross beam 15 and frame 21, and essentially the plane 21A will remain oriented in space, that is parallel to its original position, as the extensometer section 11 moves inwardly and outwardly with respect to the specimen 13. However, the use of the two beams 50 and 55 provides substantial rigidity against any tendency of the frame 21, and thus the entire extensometer section 11, to move the outer end of the frame 21 (adjacent section 24) in a direction parallel to the length of the flexure beams 50 and 55. In other words, movement of the outer end of extensometer section 11 in direction as indicated by the double arrow 60 in FIG. 2 is resisted by substantial rigidity in the mounting flexure 16 relative to beam 15. To consider this rigidity in another way, when the points 25A and 41A are contacting the specimen, the extensometer frame 21 is not permitted to oscillate or pivot in directions perpendicular to the plane 21A to any degree that will affect operation or readings from the extensometer.

The stabilizer beam 55 and the beam 50 cooperate to prevent this tendency to twist about the line or axis lying between mounting points where the points engage the specimen. However, referring to FIG. 1, the flexure beams 50 and 55 do permit the extensometer section 11, through its frame 21, to twist about an axis that is perpendicular to the plane 21A. In other words the specimen engaging pins are able to move inwardly and outwardly relative to each other on the specimen 13, so that if the specimen 13 increases in diameter where the pin 25A is engaging the specimen, with respect to the position where point 41A is engaging the specimen, such a movement will be permitted. This movement is necessary for accurate measurements in that the specimens change diameter during testing. In other words, movement in direction as indicated by the double arrow 61 in FIG. 1 is permitted by the flexure beams 50 and 55.

Movement in direction parallel to the plane 21A is also necessary in order to permit the extensometer assembly to be placed onto the specimen 13. The flexure beams 50 and 55 are pre-bent as stated so that at rest the flexure beams will move to position as represented in an exaggerated showing in dotted lines in FIG. 2.

The second extensometer section 12 is supported with respect to the rigid cross beam 15 through the flexure assembly 17 as previously stated. The flexure assembly 17 is also made to be rigid in several movement directions or degrees of freedom, preferably, as shown, being rigid to resist movement toward and away from the specimen 13, which is permited by flexure assembly 16. The flexure assembly 17 does permit the second extensometer section 12 to accommodate the necessary movements, such as accommodating different diameters of the specimen at the top and bottom contact points.

The second extensometer section 12 includes a frame 65 which has a lateral base member 66, an upright extending leg 67, that is adjacent the specimen 13, and which extends up to a level substantially mid-way between the specimen contact points to a level generally aligning with the position of the support beam 15, as shown in FIG. 1. The leg 67 has an integral laterally extending leg portion 68, which corresponds to extension 23 of frame 21 on extensometer section 11, and forms a member for attaching flexure assembly 17. This laterally extending leg 68 can be seen in FIG. 2. Additionally, the frame 65 has an upright extending leg 69 spaced from leg 67 that is used for mounting an upper extensometer arm assembly 73 which is used for measuring specimen deflections in a direction caused by torsion strain in the specimen 13. The arm assembly 73 is coupled to the upright leg member 69 through the use of a conventional cross flexure arrangement, but the movement of the arm 73 is about an axis that is generally parallel to the specimen axis. This permits the upper arm 73 to swivel or move to shift when the specimen 13 is subjected to torsional strain.

Referring to FIG. 2, the arm assembly 73 can be seen, and has an arm section 74 that mounts a specimen contact pin 75 having an end point 75A that engages the specimen 13. The pin 75 is held in place with a clamp block 76 along the side of the arm section 74. The arm section 74 also has an abutment block 77 mounted thereon to prevent the pin 75 from moving axially away from the specimen 13 under loads. The pin 75 is positioned along the side of the arm section 74, in that the direction of movement being sensed (torsion) is in a plane perpendicular to the longitudinal axis of the specimen.

The arm section 74 is supported on a cross flexure arrangement indicated generally at 80, including a cross flexure strap 81 that is clamped to the arm section 74 with a suitable clamp block 82 at one end, and is also clamped along a side surface of the upright member 69 with a clamp block 83.

A second flexure strap 85 forms part of the cross flexure assembly 80 and has a first end clamped to an end of block 82 with a clamp block 86. The strap 85 has a center portion that passes through an opening in strap 81, in a conventional manner, and a second end of strap 85 is clamped to a side of the upright member 69 with a clamp block 87.

The flexure straps 81 and 85 have central planes that are perpendicular to each other at rest position of the arm section 74 and which intersect. The line of intersection of the planes of the straps forms a pivot axis 88 for the arm section 74, and thus a pivot axis for the movement of the pin 75. Axis 88 is parallel to the axis 20 of the specimen 13. This permits the specimen contact pin 75 to move between its solid and dotted line position shown in FIG. 2. The movement of pin 75 may be in either direction from its solid line position and will cause bending of flexure straps 81 and 85. This movement can be sensed with strain gages such as strain gage 81A on the strap 81.

The arm assembly 73 is very stiff in direction along the axis 20 of the specimen 13, so it forms a reference point for axial strains and does not move axially, but the mounting of arm assembly 73 is quite soft in response to torsional strains.

The second extensometer section 12 also can be used to measure axial strains, and in FIG. 1 it can be seen that the end of the main frame 66, remote from the specimen 13, has a mounting portion 90 that mounts an extensometer arm assembly indicated generally at 91. The arm assembly 91 includes an arm section 92 that has a pin 93 attached thereto, which has a specimen engaging point 93A. The pin 93 is connected to the arm section 92 on the lower side thereof through the use of a clamp block 94. An abutment block 94A which prevents the pin 93 from moving axially relative to the arm is also fastened to the arm section 92. The arm section 92 is supported as part of the arm assembly 91 for measuring axial strain of the specimen through the use of a cross flexure assembly 95 which includes a flexure strap 96 coupled to the arm section 92 through the use of a clamp block 97, at one end of the strap 96, and the second end of the flexure strap 96 is connected to the mounting portion 90 of the frame base 66 through the use of a clamp block 98.

The flexure strap 96 has an opening in its center portion, in a conventional manner for flexure beam mountings, and a second flexure strap 100 passes through this opening and has its first end connected with a clamp block 101 to an abutment portion of the block 97. The second end of the flexure strap 100 is clamped with a suitable clamp block 102 to the mounting portion 90 of the base 66 of frame 65. Again, the planes of the flexure straps 96 and 100 are at right angles to each other and where these planes intersect a pivot axis 103 is formed generally perpendicular to the axis 20 of the specimen 13, so that the pin 93 can move in a direction along the axis 20 freely about the axis formed by the flexure straps 96 and 100.

Shielding can be used to shield the flexure assemblies, as shown typically by shields 104, and 105. Also overtravel stop plates such as those shown at 106 and 107, are mounted on the extensometer frames and have limit slots though which the respective pins extend to limit the movement of the respective pins, including the pin 41 on extensometer section 11, to prevent damage to the flexure assemblies. Also, shields 33A, 83A and 98A are provided for protection of the respective flexure assemblies.

The flexure strap 96 can have strain gages indicated generally at 96A, thereon to provide a means for sensing the axial movement of arm assembly 91.

The support flexure assembly 17 comprises a pair of flexure beams that are attached at the end of the rigid cross beam 15 opposite from the end where flexure assembly 16 is attached. Flexure assembly 17 includes a flexure beam 110 that, when flat, has a plane parallel to the axis 20 of the specimen 13. Transverse or width lines perpendicular to the longitudinal axis of the beam are parallel to axis 20. Beam 110 has a first end coupled with a connecting block 111 to the associated end of the cross beam 15. The second end of the flexure beam 110, which extends laterally of the specimen 13, is connected to the laterally extending member 68 on the extensometer frame 65 for extensometer section 12, through the use of a clamp block 112. This beam 110 is quite deep in direction parallel to the axis 20 of the specimen 13, and provides rigidity against relative movement of the frame 65 and the beam 15 under loads acting in the direction of the axis 20.

The flexure assembly 17 further includes a second flexure beam 115 which, when flat, has a plane generally at right angles to the plane of the beam 110 and is positioned laterally of the beam 110. Transverse or width lines on the beam 115 perpendicular to the longitudinal axis of the beam are perpendicular to the axis 20.

Figures 5, 6:
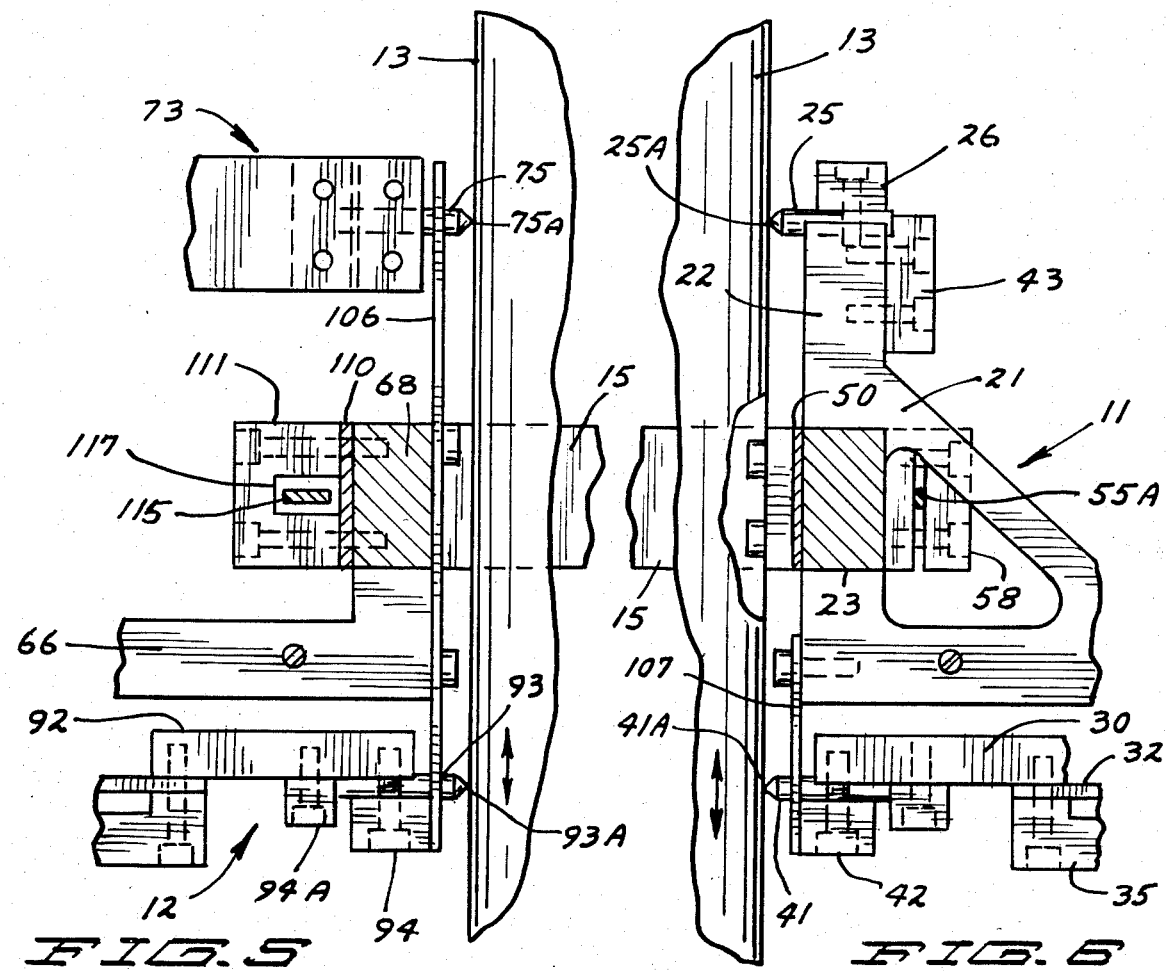
FIG. 5 is a fragmentary sectional view taken generally along line 5—5 in FIG. 2.
FIG. 6 is a fragmentary sectional view taken along line 6—6 in FIG. 2.

Beam 115 has its first end connected to the block 111 with a clamping block 116 (see FIG. 3). It should be noted that the beam 115 passes through an opening shown at 117 in FIG. 5, which is formed in the block 111. The block 111 thus has screws that are on top and bottom of beam 115 for holding the beam 110 in position, and yet will permit the beam 115 to be supported at its outer end as shown in FIGS. 2 and 3. The block 116 fits up against the end of beam 115 to clamp it against a surface of block 111 on an end section 111A formed by a notch on the lower side of the outer end of block 111, as shown in FIG. 3.

The opposite end of the beam 115 in turn is clamped to the laterally extending member 68 through the block 112. The block 112 has a notch forming an offset section as shown at 112A in FIG. 3, and the beam 115 is thus held on block 112 through the clamping block 120. When the beams 110 and 115 are fixed in place, the extensometer section 12 becomes very resistant to any movement along a center plane indicated generally at 121 in FIG. 2. The beam 115 resists any movement tending to permit the extensometer section 12 to move in and out relative to the rigid support beam 15 and thus relative to the specimen.

Additionally, the flexure assembly 17 comprising the beams 110 and 115, when clamped into place, resists any movement in direction parallel to the axis 20 relative to the rigid support beam 15. The flexure beams 110 and 115 also resist any movement tending to twist the extensometer assembly about the axis defined by a straight line between contact points 75A and 93A, which is generally parallel to the specimen axis 20. The flexure beams 110 and 115 will permit twisting movement about an axis perpendicular to axis 20 to accommodate shifting of the points 93A and 75A in and out as the specimen diameter changes. This twisting movement that is permitted is indicated by the arrow 125 in FIG. 1. The axis of pivoting would be the point of intersection of the planes of the beams 110 and 115.

In operation, axial strain of the specimen 13 along the axis 20 is measured by the relative movement between the points 25A and 41A of extensometer section 11 through the use of suitable strain gages such as those shown at 46, and any torsional strain causing relative twisting between the points 75A and 93A will be measured by movement of the point 75A about the axis 88 at the interection of the flexure straps 81 and 85. Because the frame 65 is very rigid, the reference point for torsional movement of the extensometer section 12 will be the point of engagement of pin 93A with the specimen.

Additionally, the extensometer section 12 is made so that the points 93A and 75A will separate under axial load along the axis 20, but generally speaking, the measurement of axial strain is confined only to the extensometer section 11 because of the fact that the upper point 75A can shift laterally under torsion loading and it makes compensation for the actual distance between the point 93A and 75A complex in order to get an indication of axial strength. The movement of arm assembly 91 under axial load is permitted to accommodate the axial changes without causing the reference pin 93 or the pin 75 to slip.

The torsion measurement is essentially measuring the shifting of the line between the points 93A and 75A in respect to the line between the points 25A and 41A, which form the reference line. In actual torsional loading, the line between points 25A and 41A, which forms the reference line will also shift slightly out of a plane passing through the axis 20 of the specimen because both sides of the specimen will tend to twist at their outer surfaces about the central axis 20, and the points 25A and 41A will thus shift slightly from the plane passing through the axis 20. The torsional measurement is quite easy to make with the present arrangment by using strain gages on the flexure strap 81 because the pin point 75A will shift easily relative to the reference point 93A in torsional direction due to the mounting of arm assembly 73, and this gives an indication of the amount of torsion load on specimen 13.

The assembly thus is quite rigid in all unnecessary degrees of freedom, but will be compliant in the required degrees of freedom. It has the ability to accomodate changes in diameter at both the upper and lower measuring levels on the specimen, that is the level where points 75A and 25A are located with respect to the level where points 41A and 93A are located; to accommodate uniform or unequal changes in diameter of the specimen which may occur along its length, and because of the ability of the flexure supports to twist as indicated by the arrows 125 and 61, wherein both of the extensometer sections 11 and 12 can twist, the mounting system will accommodate a shifting of the surface on one side of the specimen with respect to the other. In other words, under some loading conditions, the surface portion or side where the points 25A and 41A contact the specimen may shift in an axial direction relative to the surface portion where the points 75A and 93A contact the specimen. This is accommodated by the ability of the extensometer mounting flexure assemblies 16 and 17 to permit twisting.

While it is possible to have the same type of flexure supports on both extensometer sections that permits in and out movement relative to the specimen, better control is obtained with a rigid flexure relative to in and out movement as is obtained with the flexure assembly 17 on one side. There is a need, of course, to be able to separate the extensometer sections for mounting onto the specimen. The spring load has to be sufficient so that the extensometers will stay on the specimen.

One of the disadvantages of having both sides capable of moving in and out relative to the axis of the specimen is that the cross beam 15 then could move back and forth laterally of the specimen because of the spring mounting, and could get into a situation where it would oscillate or vibrate under oscillating torsional loading of the specimen.

This could provide a feedback into the rest of the instrumentation to cause dynamic errors, and that effect is removed by making the flexure 17 rigid against in and out movement relative to the specimen.

The extensometer sections have individual freedom to twist about transverse axes generally perpendicular to the axis of the specimen and perpendicular to the planes of the lines between the points on the extensometers, with little effect on the other.

One extensometer section must be able to move axially in direction along the specimen axis relative to the other, and that is accommodated by the ability of the flexures 16 and 17 to twist as was illustrated by the arrows 61 and 125. Axial measurements can be made with only one of the extensometer sections, or with both. The points of the extensometer that does not measure torsion, that is extensometer section 11, form the reference line in this system. As was pointed out, the points on this reference line will skew slightly from a plane passing through the axis of the specimen, and of course on the side that measures torsion, the support flexure assembly 17 has to resist any giving under torsional loading so that the torsion on the specimen is measured by the arm assembly 73 which pivots freely about an axis parallel to the specimen axis. Under torsion the point spacing on the side that does not measure torsion will increase under torsional loads even with no axial load, and the flexures for supporting the two specimen sections together permit this, again because of the ability to twist.

Although the present invention has been described with reference to preferred embodiments, workers skilled in the art will recognize that changes may be made in form and detail without departing from the spirit and scope of the invention.

What is claimed is:

1. A support assembly for a pair of extensometer sections which measure torsional and axial strains on a specimen having a loading axis, comprising a rigid cross beam of length to span such a specimen;

a first flexure assembly at a first end of said cross beam coupled to said cross beam and coupled to a first of said extensometer sections at a position adjacent the end of the first extensometer section closest to such specimen to be tested;

a second flexure assembly coupled to a second end of said cross beam and to a second of said extensometer sections at position adjacent the end of the second extensometer section closest to such specimen to be tested;

said flexure assemblies supporting the two extensometer sections substantially diametrically opposed when installed on such specimen, said extensometer sections each having individual specimen engaging points axially spaced from each other for movement with the surface portions of such specimen in a direction perpendicular to the loading axis;

said first and second flexure assemblies each including a separate pair of flexure beams spaced from each other and the beams of each flexure assembly being substantially coextensive and having their ends coupled to the respective ends of the rigid cross beam and to the first and second extensometer sections, respectively, to rigidly resist pivotal movement of the extensometer sections about a straight line between the points of contact of the respective extensometer section and such specimen;

said first flexure assembly comprising one flexure beam of its pair having a width dimension substantially perpendicular to the one flexure beam longitudinal axis, said width dimension being substantially parallel to the specimen axis, and the one beam longitudinal axis being substantially perpendicular to the specimen axis, and said first flexure assembly further including another flexure beam of its pair having a width dimension generally perpendicular to its longitudinal length and such width dimension of the other flexure beam being substantially parallel to the specimen axis and spaced from the one beam of the pair, said beams of the first flexure assembly extending from the cross beam laterally to the specimen beyond the location where the first extensometer section contacts the specimen and being coupled to portions of the first extensometer section on an opposite side of said location from the rigid cross beam; and the flexure beams of said second flexure assembly having width dimensions perpendicular to their respective longitudinal axes, the width dimensions of the flexure beams of said second flexure assembly being substantially perpendicular to each other.

2. The apparatus as specified in claim 1 wherein the second extensometer section has a pair of members with points contacting the specimen and wherein said second flexure assembly beams extend laterally of a line defining the line of contact between the two contact points of the attached second extensometer section and the specimen, and means coupling the ends of the beams of the second flexure assembly on an opposite side of such line to the second extensometer, whereby the beams of the second flexure assembly extend substantially an equal distance on both sides of said line of contact between the cross beam and the junction of the second flexure assembly to the second extensometer.

3. A support assembly for a pair of extensometer sections which measure torsional and axial strains on a specimen having a loading axis, comprising a rigid cross beam of length to span such a specimen;

a first flexure assembly at a first end of said cross beam coupled to said cross beam and coupled to a first of said extensometer sections at a position adjacent the end of the first extensometer section closest to such specimen to be tested;

a second flexure assembly coupled to a second end of said cross beam and to a second of said extensometer sections at position adjacent the end of the second extensometer section closest to such specimen to be tested;

said flexure assemblies supporting the two extensometer sections substantially diametrically opposed when installed on such specimen, said extensometer sections each having individual specimen engaging points axially spaced from each other for movement with the surface portions of such specimen in a direction perpendicular to the loading axis;

said first and second flexure assemblies each including a separate pair of flexure beams spaced from each other and the beams of each flexure assembly being substantially coextensive and having their ends coupled to the respective ends of the rigid cross beam and to the first and second extensometer sections, respectively, to rigidly resist pivotal movement of the extensometer sections about a straight line between the points of contact of the respective extensometer section and such specimen;

said first flexure assembly comprising one flexure beam of its pair having a width dimension substantially perpendicular to the one flexure beam longitudinal axis, said width dimension being substantially parallel to the specimen axis, and the one beam longitudinal axis being substantially perpendicular to the specimen axis, and said first flexure assembly further including another flexure beam of its pair having a width dimension generally perpendicular to its longitudinal length and such width dimension of the other flexure beam being parallel to the specimen axis and spaced from the one beam of the pair, said beams of the first flexure assembly extending from the cross beam laterally to such specimen to be tested beyond the location where the first extensometer section contacts the specimen and being coupled to portions of the first extensometer section on an opposite side of said location from the rigid cross beam; and said one beam of the first flexure assembly having a small width dimension to increase the flexibility of said first flexure assembly.

4. The apparatus as specified in claim 3 wherein said first flexure assembly resists relative movement between the first extensometer section and the cross beam in a direction generally parallel to the specimen axis.

5. The apparatus as specified in claim 3 wherein said first flexure assembly has spring beams which are pre-bent into a curved shape, and which exert a resilient force through the first extensometer section against the side surface of a specimen to be tested.

6. The apparatus as specified in claim 3 wherein said first extensometer section has a pair of contact points engaging the side surface of a specimen to be tested at axially spaced locations, one of said contact points being movable relative to the other in direction along the longitudinal axis of said specimen, and means to measure the amount of change in spacing between the contact points of the first extensometer section.

7. The apparatus as specified in claim 6 wherein said second extensometer section comprises a pair of contact points engaging a side surface of a specimen to be tested at axially spaced locations, said second extensometer comprising a frame, one of said contact points being mounted on said frame for movement about a pivotal axis generally parallel to the specimen axis whereby twisting movement of the specimen will cause the one contact point to move transversely to the specimen axis, and means to measure the amount of deflection movement of said one contact point relative to the other on the second extensometer section.

8. An extensometer assembly for measuring axial and torsional strain of an elongated specimen to be tested having a longitudinal loading axis comprising:

a first extensometer section having a pair of contact points adapted to engage a side of an elongated specimen at spaced locations;

a second extensometer section having a second pair of contact points adapted to engage such a specimen at substantially diametrically opposed points from the first mentioned points of the first extensometer section;

a rigid support beam spaced laterally from the first and second extensometer sections and spanning such specimen in a direction between the first and second extensometer sections;

a first flexure assembly connecting said support beam to a first extensometer section, said first flexure assembly comprising a first pair of flexure beams that have longitudinal axes that are generally coextensive and are spaced from each other along their lengths; and a second flexure assembly extending between a second end of said rigid beam and said second extensometer section comprising a second pair of flexure beam members which have elongated longitudinal axes, and which are spaced from each other and generally coextensive;

the flexure beams of the first flexure assembly being pre-bent to move the first extensometer section toward the second extensometer section more closely than the diameter of such specimen to be tested, whereby the first and second extensometer sections are spring loaded onto such specimen to be tested when the extensometer sections are mounted on such specimen, said flexure beams of said second flexure assembly each have width dimensions generally perpendicular to their longitudinal flexure lengths, and said width dimensions of the respective flexure beams of the second flexure assembly being substantially perpendicular to one another, and one of the width dimensions being perpendicular to the axis of a specimen on which the extensometer sections are mounted when in use.

9. The apparatus as specified in claim 8 wherein said second extensometer section comprises a frame, one of the contact points of the second extensometer section being mounted on the frame thereof and restrained against movement about any axis parallel to a loading axis of a specimen which is to be tested and said second extensometer section having an arm mounted on said frame and movable about a pivot axis generally parallel to the axis of a specimen to be tested, so that the second contact point will move in a plane perpendicular to the loading axis of such a specimen.

10. The apparatus as specified in claim 9 wherein said first and second flexure assemblies both extend laterally of the respective line between the contact points of the respective connected extensometer sections to an opposite side of such line from the rigid support beam, and each of said extensometer sections having frame portions to which the ends of the flexure beams of the respective flexure assemblies are mounted at a location spaced from the respective lines defined by the points of contact of the respective extensometer sections a distance substantially equal to that from each of said respective lines to position where the opposite ends of the flexure beams connect to the rigid support beam.

11. The apparatus as specified in claim 8 wherein said first flexure assembly has a first flexure beam with a width dimension and a first length, and a second flexure beam of said first flexure assembly having a substantially smaller width dimension than the first flexure beam for the first flexure assembly.

12. The apparatus as specified in claim 11 wherein said first extensometer section has a first frame and a first of its contact points being fixed to the first frame, an extensometer arm pivotally mounted to said first frame about an axis generally perpendicular to the axis of a specimen which is to be tested, said second contact point being mounted on said extensometer arm for movement toward and away from the first contact point of the first extensometer section.

13. An extensometer assembly for measuring axial and torsional strain of an elongated specimen to be tested having a longitudinal loading axis comprising:

a first extensometer section having a pair of contact points adapted to engage a side of an elongated specimen at spaced locations;

a second extensometer section having a second pair of contact points adapted to engage such a specimen at substantially diametrically opposed points from the first mentions points of the first extensometer section;

a rigid support beam spaced laterally from the first and second extensometer sections and spanning such specimen in a direction between the first and second extensometer sections;

a first flexure assembly connecting said support beam to the first extensometer section, said first flexure assembly comprising a first pair of flexure beams that have longitudinal axes that are generally coextensive and are spaced from each other along their lengths; and a second flexure assembly extending between a second end of said rigid beam and said second extensometer section comprising a second pair of flexure beam members which have elongated longitudinal axes, and which are spaced from each other and generally coextensive, the second flexure assembly being substantially rigid to resist movement perpendicular to the loading axis with respect to the rigid beam, while permitting twisting about an axis parallel to the beam member's longitudinal axis;

the flexure beams of the first flexure assembly being resiliently movable in direction perpendicular to the loading axis and being pre-bent to move the first extensometer section toward the second extensometer section more closely than the diameter of such specimen to be tested, whereby the first and second extensometer sections are spring loaded onto such specimen to be tested when the extensometer sections are mounted on such specimen.

* * * * *